Jan. 5, 1965    O. C. HOLDERER    3,164,023
MOTION SENSING TRANSDUCER
Filed Sept. 10, 1962    2 Sheets-Sheet 1

Oscar C. Holderer,
*INVENTOR.*

BY

Jan. 5, 1965  O. C. HOLDERER  3,164,023
MOTION SENSING TRANSDUCER
Filed Sept. 10, 1962  2 Sheets-Sheet 2

Oscar C. Holderer,
INVENTOR.

BY

United States Patent Office 3,164,023
Patented Jan. 5, 1965

3,164,023
MOTION SENSING TRANSDUCER
Oscar C. Holderer, Huntsville, Ala., assignor to the United States of America as represented by the Secretary of the Army
Filed Sept. 10, 1962, Ser. No. 222,747
4 Claims. (Cl. 73—516)
(Granted under Title 35, U.S. Code (1952), sec. 266)

The invention described herein may be manufactured and used by or for the Government for governmental purposes without the payment of any royalty thereon.

This invention relates generally to a transducer and specifically to a transducer which provides means for detecting and recording inclinations and accelerations.

According to the present invention, a sealed vessel contains a displaceable mass and a fluid having an electrical resistance different from that of the displaceable mass. The vessel has mounted therein a plurality of electrodes arranged so that a deviation in the position or movement of the device creates an unbalanced condition in an electrical circuit.

It is an object of this invention to provide a simple but accurate motion sensing transducer.

A further object of this invention is to provide a transducer for converting changes in inclination or acceleration of a body into electrical signals which are proportional to said changes.

A further object of this invention is to provide a transducer which is responsive to acceleration-vectors in multiple planes.

The foregoing and other objects of this invention will become more fully apparent from the following detailed description and from the accompanying drawings, in which.

Figure 1:
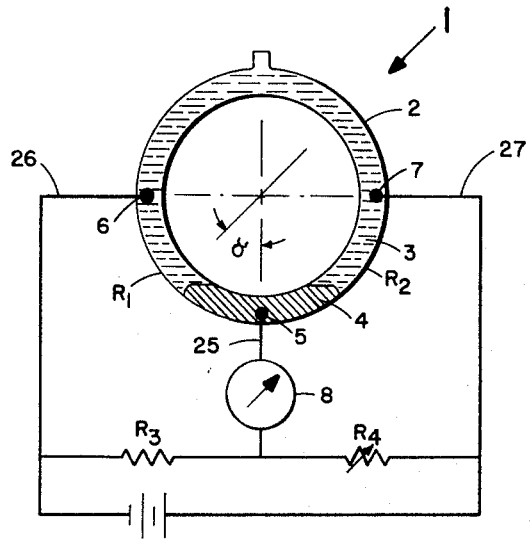
FIGURE 1 is a sectional view illustrating a preferred embodiment of the invention with an associated circuit.

Referring to FIGURE 1, the reference numeral 1 designates a transducer useful for detecting changes in inclination of a body (not shown), having a toroidal shaped tubular member 2, which may be made of glass, and electrodes 5, 6 and 7 mounted therein. The electrodes have lead wires 25, 26 and 27 attached thereto which extend through the walls of tubular member 2. The tubular member is filled with a liquid 3 which may be any suitable liquid having a resistivity substantially different from that of a displaceable mass 4, which is confined within the tubular member. In this embodiment a pool of mercury is used as the displaceable mass. When the transducer is resting in a normal or initial position the mercury will lie adjacent to and in contact with electrode 5 and will be spaced an equal distance from electrodes 6 and 7. An inclination of the device will cause the mercury to become displaced a distance proportional to the angle of inclination $\alpha$. Since the resistance of the liquid is greater than that of mercury, displacement thereof will result in an increase in resistance between electrodes 5 and 7 and a decrease in the resistance between electrodes 5 and 6. A measurement of this change in resistance can be obtained by the circuit of FIGURE 1, or by any suitable means, such as a pair of meters connected betwen electrodes 5 and 6 and electrodes 5 and 7. When transducer 1 is combined with a suitable circuit, for example the one shown in FIGURE 1, for indicating and/or controlling the inclination of a moving body, resistances $R_1$ and $R_2$ represent, respectively, the resistances of the paths between electrodes 5, 6 and electrodes 5, 7. Resistance elements $R_3$ and $R_4$ form the "inactive" legs of a bridge circuit and resistance $R_4$ is made variable for zeroing or calibrating the circuit. When mercury pool 4 is displaced from its normal position the bridge becomes unbalanced and indicator or control means 8 will respond accordingly.

Figure 2:
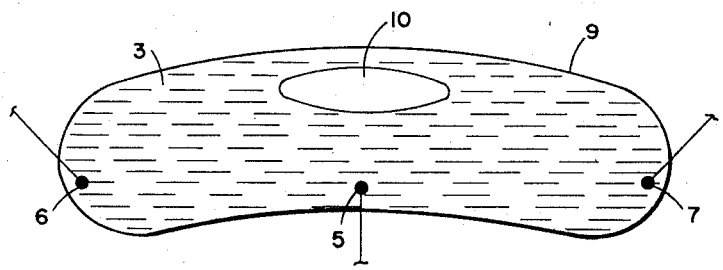
FIGURE 2 shows a modification of the transducer.

The modification shown in FIGURE 2 is different from the above described device in that an elongated sealed vessel 9 is used and the displaceable mass comprises a gas bubble 10. The operation of this embodiment is substantially the same as that of FIGURE 1 and further discussion is not considered necessary.

Figure 3:
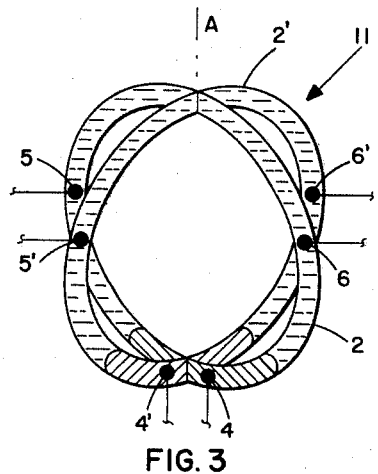
FIGURE 3 illustrates another embodiment for two-directional sensing.

FIGURE 3 illustrates an embodiment similar to the transducer shown in FIGURE 1. In order to provide for two-directional sensing the device utilizes a second toroidal member 2', placed in a plane perpendicular to the plane of the first member 2 having a diametrical axis A coincident with a diametrical axis of the first tube.

Figure 4:
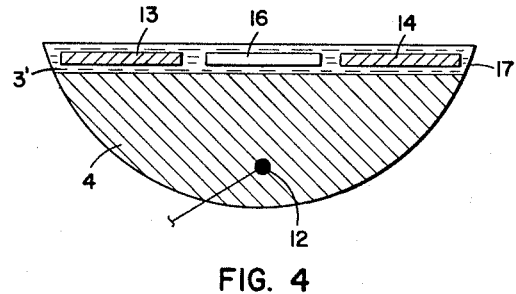
FIGURE 4 illustrates a sectional view of a further embodiment for two-directional sensing.

A further device for two-directional sensing is illustrated in FIGURE 4, having a hemispherical shell 17 with electrodes 12 through 16 mounted therein. An acceleration responsive mass 4, which again may be mercury, is placed in the shell with a suitable dielectric liquid 3' substantially filling the shell. The device includes an electrode 12 contacting the mecury and plate-like electrodes 13–16 disposed immediately above the mercury and 90° apart (electrode 15 is not shown in the drawing since FIGURE 4 is a sectional view). Each of the electrodes 13–16 together with mercury pool 4 forms a capacitor having a dielectric separator 3'. When the shell is tilted, for example to the left, the mercury pool will shift and thereby decrease the amount of dielectric material and the separation between electrode 13 and the mercury pool; and cause an increase in dielectric material and separation between electrode 14 and the mercury pool. To obtain an accurate indication of any change in motion it is simply necessary to measure or sense the change in capacitance with any suitable conventional measuring circuit.

Figure 5:
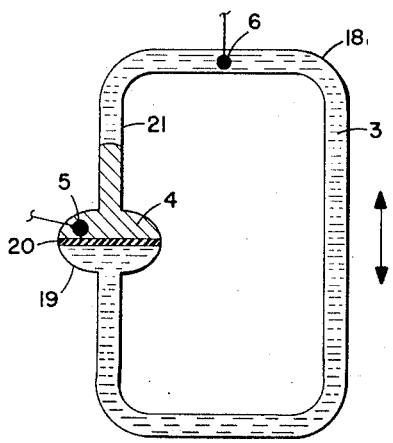
FIGURE 5 illustrates another embodiment of the invention.

The embodiment illustrated in FIGURE 5 comprises a tubular member 18 having a generally rectangular shape with one leg 21 thereof having an enlarged portion 19. The enlarged portion is divided into two sections by a flexible nonporous member, such as elastic membrane 20. The elastic membrane supports a conductive fluid, illustrated as mercury pool 4, which extends into leg 21. The tubular member is substantially filled with liquid 3 so that when the device is subjected to an acceleration in the direction of the arrow the height of the column of conductive fluid in leg 21 is varied, thereby displacing liquid 3 and changing the resistance between electrode 5 mounted in enlarged portion 19 and electrode 6 mounted in the tubular member and in contact with liquid 3. This change in resistance can be detected by any suitable means that is calibrated to indicate changes in movement of the member.

While the invention has been described with reference to the preferred embodiment thereof, it will be apparent that various modifications will occur to those skilled in the art within the scope of the invention as set forth in the appended claims.

The following invention is claimed:

1. An inclination transducer comprising: first and second electrically non-conducting toroidal tubes, said second tube being in a plane displaced 90° from the plane of said first tube and having a diametrical axis coincident with a diametrical axis of said first tube; a plurality of electrodes mountd in each of said tubes; means for connecting said electrodes to an electrical circuit; a mass of electrical conductive material within each of said tubes and positioned adjacent to and in contact with one of said electrodes and spaced an equal distance from other of said electrodes in an initial position; and a liquid having an electrical resistance gerater than that of said conductive material, substantially filling each of said tubes, whereby said mass displaces said liquid in response to a change in position of said vessel thereby changing the conductivity between said electrodes.

2. A device as set forth in claim 1, wherein said mass of material is mercury.

3. A transducer comprising: a sealed tubular member having a substantially rectangular configuration and a leg having an enlarged portion; an elastic membrane dividing said enlarged portion; a pool of mercury disposed on one side of said membrane and extending into said leg; a liquid having an electrical resistance greater than that of said mercury substantially filling said tubular member and disposed on the other side of said membrane; a first electrode mounted in said enlarged portion and in contact with said mercury; and a second electrode mounted in said tubular member and in contact with said liquid, whereby an acceleration force applied against said tubular member varies the height of mercury in said one leg and thus alters the electrical conductivity between said first and second electrodes.

4. A transducer comprising: a sealed tubular member having a substantially rectangular configuration and a leg having an enlarged portion; a flexible nonporous member dividing said enlarged portion, a conductive fluid disposed on one side of said flexible member and extending into said leg; a liquid having a conductivity different from that of said conductive fluid substantially filling said tubular member and disposed on the other side of said membrane; a first electrode mounted in said enlarged portion and in contact with said conductive fluid; and a second electrode mounted in tubular member and in contact with said liquid, whereby an acceleration force applied against said tubular member varies the height of the conductive fluid in said one leg and thus alters the electrical coupling between said first and second electrodes.

References Cited by the Examiner
UNITED STATES PATENTS

| | | | |
|---|---|---|---|
| 1,409,537 | 3/22 | Franzen | 33—209 X |
| 1,605,666 | 11/26 | Kronauer | 338—151 X |
| 1,626,567 | 4/27 | Steinbrecht. | |
| 1,928,971 | 10/33 | Dillon. | |
| 2,252,727 | 8/41 | Pepper. | |
| 2,386,777 | 10/45 | Bentley | 73—514 X |
| 2,711,590 | 6/55 | Wilcox | 33—206.5 |
| 3,008,334 | 11/61 | Lees | 73—516 X |
| 3,029,644 | 4/62 | Loveless | 73—516 X |

FOREIGN PATENTS

| | | |
|---|---|---|
| 72,020 | 10/59 | France. |
| 533,423 | 12/21 | France. |
| 1,255,255 | 1/61 | France. |

RICHARD C. QUEISSER, *Primary Examiner.*

ROBERT EVANS, *Examiner.*